UNITED STATES PATENT OFFICE.

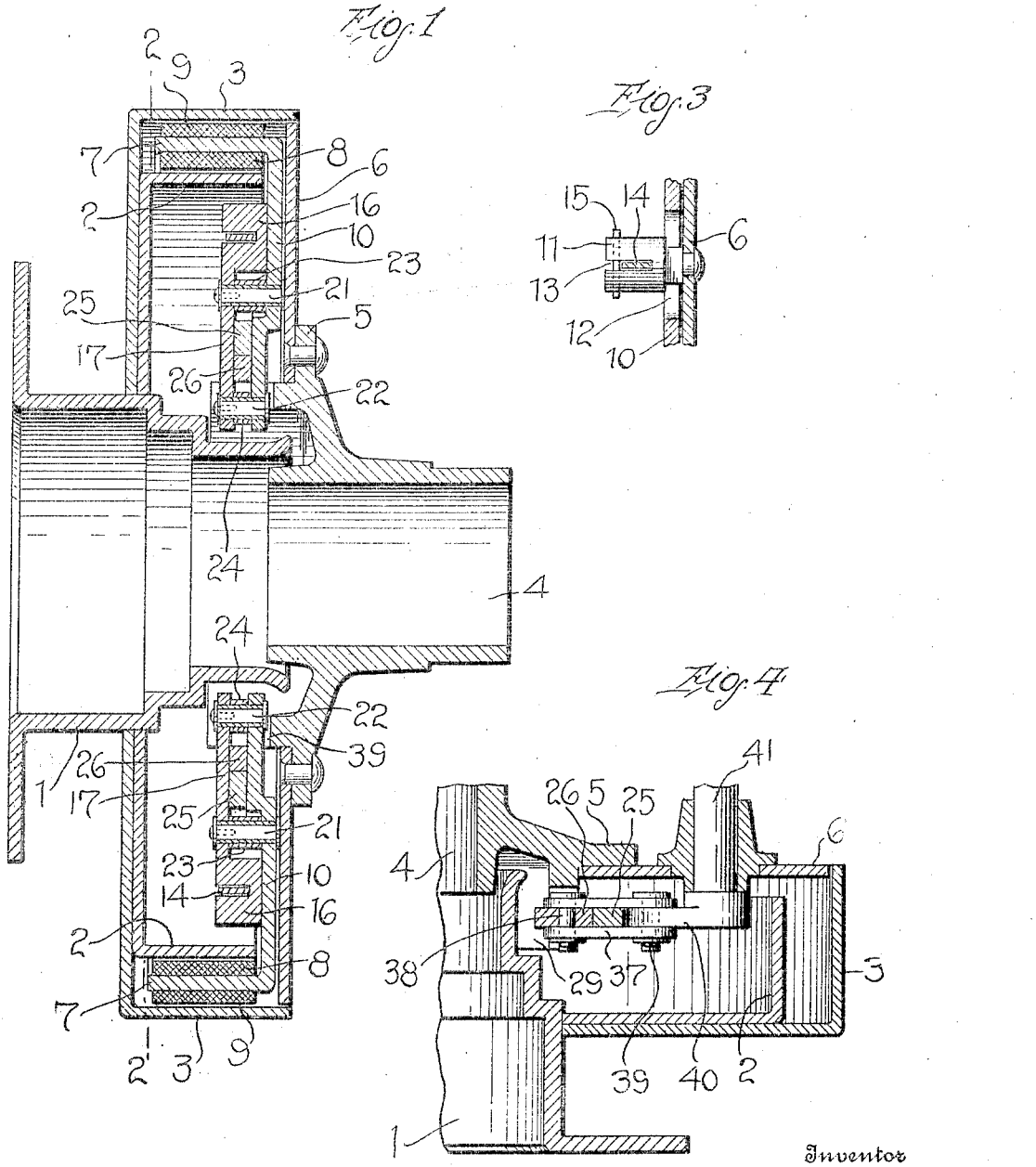

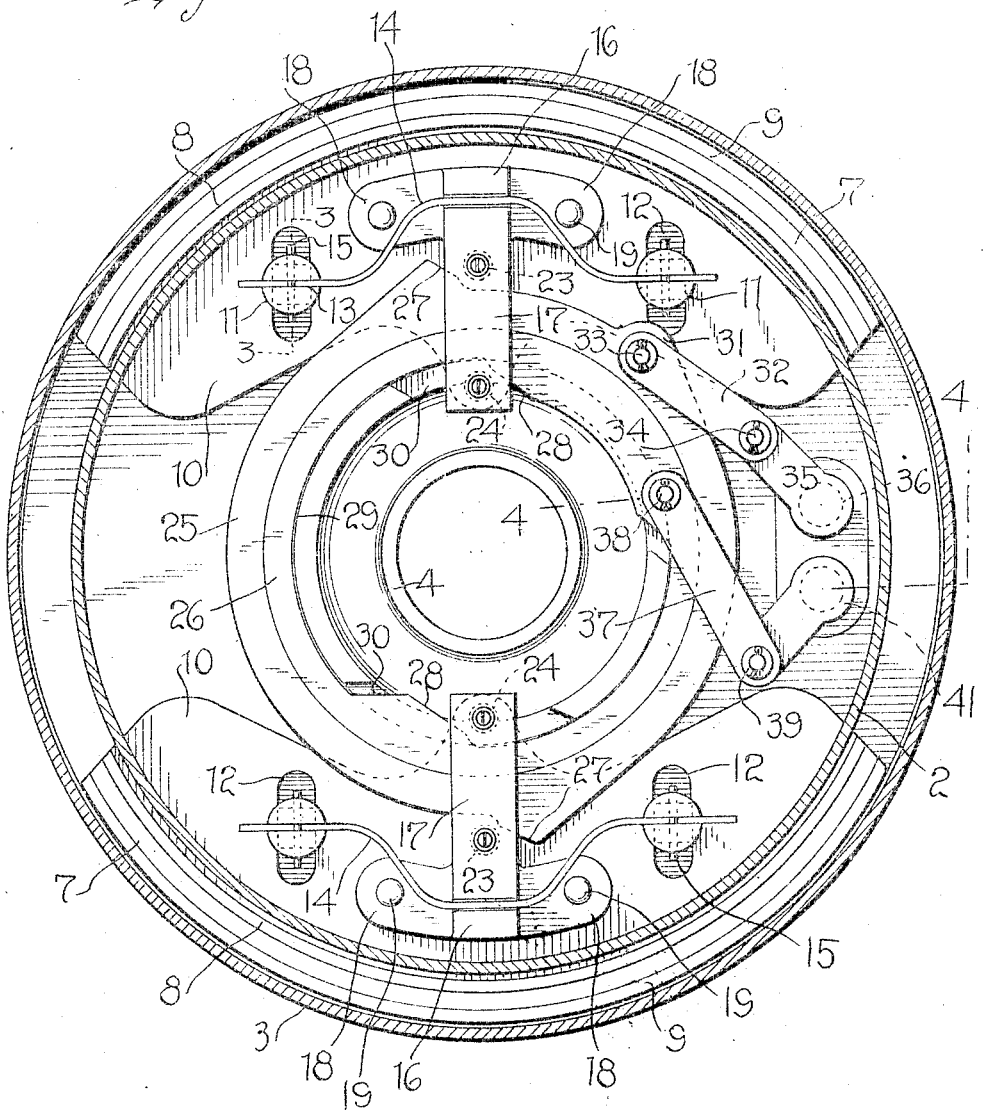

THOMAS E. LINFOOT, OF FLINT, MICHIGAN.

BRAKE.

1,097,451.     Specification of Letters Patent.     Patented May 19, 1914.

Application filed November 24, 1913. Serial No. 302,773.

*To all whom it may concern:*

Be it known that I, THOMAS E. LINFOOT, a citizen of the United States, residing at Flint, in the county of Genesee and State of Michigan, have invented certain new and useful Improvements in Brakes, of which the following is a specification, reference being had to the accompanying drawings.

This invention comprehends certain new and useful improvements in brakes and has for its primary object to provide an improved form of brake which will be composed of a small number of parts and which will be extremely simple as well as highly efficient in operation.

Another object is to provide a brake which may be employed upon vehicle wheels such as automobile wheels and which will have double-faced brake shoes adapted for engagement with either the inner face of an outer drum or the outer face of an inner drum, as desired.

A further object is to provide a brake of this character which will be positive in operation and which may be readily assembled and adjusted.

A still further object is to generally improve and simplify the construction and operation of devices of this character and provide a brake which may be used as a service brake or an emergency brake, as occasion may require.

With the above and other objects in view, my invention consists in certain novel constructions, combinations, and arrangements of parts to be hereinafter more fully described, claimed, and illustrated in the accompanying drawings, in which, Figure 1 is a transverse vertical sectional view through the complete device; Fig. 2 is a longitudinal vertical section on the line 2—2 of Fig. 1; Fig. 3 is a detail sectional view on the line 3—3 of Fig. 2; and Fig. 4 is a detail sectional view on the line 4—4 of Fig. 2.

Referring more specifically to the drawings in which similar reference characters designate corresponding parts throughout the several views, 1 designates the hub of an ordinary wheel having an inner brake drum 2 and an outer brake drum 3 fixed thereto. The axle casing 4 projects slightly into the inner end of the wheel hub 1 and has the annular outwardly directed brake flange 5, to which is secured the brake flange disk 6 which extends to the free circular edge of the outer brake drum 3, it being understood that the outer brake drum projects inwardly farther than the inner brake drum 2, thereby leaving a space between the inner brake drum 2 and the brake flange disk 6.

Between the inner and outer brake drums I have positioned a pair of double-faced brake shoes 7 adapted for engagement with either said inner or outer brake drum, as will be later clearly understood. Each shoe 7 has inner and outer linings 8 and 9, respectively, as clearly shown in Fig. 1. The brake shoes 7 are formed by directing at right angles the outer edges of the brake shoe carrying plates 10 positioned against the brake flange disk 6 and secured in position against the same by the combination stop and guide pins 11 which are carried by the brake flange disk 6 and extend through the vertical elongated guide slots 12 in the brake shoe carrying plates 10, said pins being preferably square in cross-section, the purpose of which will later appear.

The combination stop and guide pins 11 are provided with transverse openings 13 through which are engaged the opposite ends of the reversely curved springs 14 which are held in proper position in the combination stop and guide pins 11 by the keys 15 engaged transversely through said pins 11 forwardly of the springs 14. The central offset portions of the reversely curved springs 14 are engaged through the heads 16 of the vertical supporting members 17, said heads 16 having the oppositely directed ears 18 which are secured against the brake shoe carrying plates 10 by the bolts 19. The main portions of the vertical supporting members 17 are spaced from the plates 10 and are connected with the latter by the pins 21 and 22 and upon which are mounted the rollers 23 and 24, respectively, between which are positioned the outer and inner cam rings 25 and 26, the outer cam ring 25 being adapted for engagement with the rollers 23 on the pins 21 to force the brake shoes 7 outwardly, while the inner cam ring 26 is adapted for engagement with the inner rollers 24 on the pins 22 to draw the brake shoes 7 inwardly. It will also be understood that the brake rings 25 and 26 are also positioned between the main portions of said plates 10.

The outer cam ring 25 has the opposite cam portions 27 upon its outer periphery which are normally positioned adjacent the rollers 23, whereby when the ring 25 is rotated in the proper direction, said cam portions 27 will engage said rollers 23 and force outwardly the double-faced brake shoes 7 and engage the outer linings 9 of the same with the inner face of the outer brake drum 3. The inner cam ring is provided with the opposite cam portions 28 which are normally adjacent the inner rollers 24 upon the pins 22 and will engage said rollers and thereby draw the double-faced brake shoes 7 inwardly when the inner cam ring 26 is rotated in the proper direction. The inner cam ring 26 is adapted for rotation around the outwardly directed annular flange 29 carried by the brake flange 5 which flange 29 is provided with opposite openings 30 to accommodate the flanged portions 28 of the ring 26 and the inner ends of the vertical supporting members 17 and brake shoe carrying-plate 10, as will be clearly understood by referring to the drawings. The outer cam ring 25 has an ear 31 projecting from its periphery and upon the opposite sides of which are pivoted the inner ends of the connecting links 32 by the pivot pin 33, the outer ends of said connecting links 32 being pivoted upon the pivot pin 34 carried in the free end of the arm 35 projecting laterally from the rock shaft 36 to which any suitable or other operating means (not shown) may be connected for operating said rock shaft 36 and thereby rotating the outer cam ring 25 in the proper direction. The inner cam ring 26 has the inner ends of the connecting links 37 pivoted thereto, by the pivot pin 38 while the outer ends of said connecting links 37 are mounted upon the pivot pin 39 carried in the outer end of the arm 40 projecting laterally from the rock shaft 41 to which may also be connected a lever or other suitable operating means (not shown) for rocking said shaft 41 and thereby rotating the inner cam ring 26 in the proper direction, as will be clearly understood.

From the foregoing, it will be clearly apparent that in ordinary service, the operating means connected with the rock shaft 41 is properly manipulated to rotate the inner cam ring 26 to cause the cam portions 28 thereof to work upon the rollers 24 and thereby draw inwardly the vertical supporting members 17 and the brake shoe carrying-plates 10, engaging the inner linings 8 of the double-faced brake shoes 7 with the inner brake drum 2. As soon as the rock shaft 41 is allowed to return to normal position, however, the reversely curved springs 14 will serve to return the brake shoes to their normal positions, thereby causing the inner rollers 24 to assist in returning the inner cam ring 26 to its normal or inoperative position. It will be understood that movement of the inner cam ring 26 in either direction will be limited by the end walls of the opposite openings 30 in the flange 29 around which said inner cam ring 26 rotates and by means of which said inner cam ring 26 is retained in proper position. When an emergency brake is required, however, the operating means for the rock shaft 36 is properly manipulated to rock said shaft 36 in the proper direction to rotate the outer cam ring 25 to bring the opposite cam portions 27 thereof into engagement with the outer rollers 23 and thereby force the double-faced brake shoes 7 outwardly and the outer lining 9 thereof into engagement with the outer brake drum 3.

While I have shown the preferred embodiment of my invention, it will be understood that minor changes in the details of construction and arrangement of parts may be made within the scope of the appended claims without departing from the spirit of my invention or sacrificing any of the advantages of the same.

What I claim is:—

1. A device of the class described comprising the combination with spaced inner and outer brake drums, of a double-faced brake shoe positioned therebetween and adapted for engagement with either of said brake drums, and means for normally retaining said brake shoe in spaced relation to said brake drums.

2. A device of the class described comprising the combination with an inner brake drum and an outer brake drum, of a double-faced brake shoe, means for supporting said brake shoe, means for resiliently retaining the brake shoe in normal position, means for forcing the brake shoe into engagement with the inner brake drum, and means for forcing the brake shoe into engagement with the outer brake drum.

3. A device of the class described comprising the combination with inner and outer brake drums, of a brake shoe positioned therebetween, means for retaining the brake shoe in spaced relation to said brake drums, means for forcing the brake shoe into engagement with the inner brake drum, and means for forcing the brake shoe into engagement with the outer brake drum.

4. A device of the class described comprising the combination with inner and outer brake drums, of a brake shoe positioned between said brake drums, means for supporting said brake shoe, means for forcing the brake shoe into engagement with the inner brake drum, means for forcing the brake shoe into engagement with the outer brake drum, means for returning the brake shoe to normal position, and means for guiding said brake shoe.

5. A device of the class described comprising the combination with a hub, an inner brake drum and an outer brake drum carried by said hub, of a brake flange disk, means for supporting said brake flange disk, a brake shoe-carrying member mounted for movement upon the brake flange disk, a double-faced brake shoe carried by the brake shoe-carrying member and positioned between the brake drums, said double-faced brake shoe being normally in inoperative position, means for forcing the brake shoe into engagement with the inner brake drum, means for forcing the brake shoe into engagement with the outer brake drum, means for guiding said brake shoe, and means for returning the brake shoe to inoperative position.

6. A device of the class described comprising the combination with a hub, an inner brake drum carried by said hub, an outer brake drum carried by said hub, of a stationary member, a brake flange disk carried by said stationary member, a brake shoe-carrying member mounted on said brake flange disk and having a right angled portion forming a double-faced brake shoe, a vertical supporting member secured to the brake shoe-carrying member, means for connecting said vertical supporting member and said brake shoe-carrying member, rollers mounted on said connecting means, cam members positioned between said vertical supporting member and said brake shoe-carrying member and between the inner and outer connecting means, means for operating the outer cam member to force the same into engagement with the rollers mounted on the connecting means and thereby move the double-faced brake shoe outwardly and into engagement with the outer brake drum, means for operating the inner cam member to force the same into engagement with the rollers mounted on the inner connecting means and thereby move the brake shoe inwardly and into engagement with the inner brake drum, means for guiding the brake shoe, and means for resiliently retaining said brake shoe in normal position.

7. A device of the class described comprising the combination with a hub and a stationary member, of inner and outer brake drums rigid with said hub, double-faced brake shoes positioned between said inner and outer brake drums, an outwardly directed flange carried by said stationary member, brake shoe supporting means, vertical supporting members, means for connecting said vertical supporting members and the brake shoe supporting means, rollers mounted on the last mentioned means, said outwardly directed flange being provided with oppositely disposed openings, said brake shoe-carrying means and vertical supporting members being extended through said openings, means positioned between the rollers and mounted upon the outwardly directed flange for moving the double-faced brake shoes inwardly and outwardly to engage the same with the inner and outer brake drums, means for operating the last mentioned means, means for guiding the brake shoes, and means for resiliently retaining the same in normal position.

In testimony whereof I hereunto affix my signature in the presence of two witnesses.

THOMAS E. LINFOOT.

Witnesses:
CHARLES E. HENDRICKS,
CHARLES THOS. SCANNELL.